United States Patent Office 3,578,457
Patented May 11, 1971

3,578,457

PHOTOSENSITIVE DIAZOTHIOETHER MATERIAL

Harke Jan Houtman, Cornelis Johannes Schoot, Jan Boven, and Leendert Klaas Hellinga van Beek, Emmasingel, Eindhoven, Netherlands, assignors to U.S. Philips Corporation, New York, N.Y.

No Drawing. Filed Feb. 10, 1969, Ser. No. 798,127
Claims priority, application Netherlands, Feb. 13, 1968, 6802059
Int. Cl. G03c *1/52, 1/62, 1/76*
U.S. Cl. 96—91 4 Claims

ABSTRACT OF THE DISCLOSURE

A photosensitive material which consists of a support which is electrically non-conductive at least at its surface with a photosensitive layer, the active compound of which consists of an aromatic diazothioether of the type

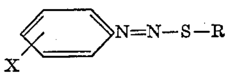

in which Formula X is one or more substituents, preferably 4-nitro or 3,5-dichloro - 4 - dimethylamino, and in which Formula R is a branched or non-branched alkyl group or aralkyl group.

This material is suitable for use in the method according to which it is treated, after exposure to light, with mercurous ions in the presence of moisture and preferably in the presence of silver ions. The resulting mercury of silver amalgam nuclei image may be intensified to a visible metal image by physical development.

The invention relates to a photosensitive material which consists of a base layer which is essentially non-conductive at least at its surface and in which or on which the active compound is present.

The active compound is of the type which, by exposure to light, produces a light reaction product which is capable of reacting with metal ions in the presence of moisture in a secondary reaction while forming metal which is deposited in the form of a latent image, consisting of finely dispersed metal nuclei. This latent image is intensified by physical development to form a visible image which shows the desired optical density and/or electrical conductivity.

A photosensitive material is known which is based on this principle and which contains as the photosensitive compound inter alia a compound from a certain class of diazonium compounds, a ferric compound of a uranyl compound, from which, by exposure to light, a light reaction product is obtained which is capable of reducing a soluble silver compound while forming a physically developable image consisting of silver nuclei. This material has the drawback that the pH in the photosensitive layer, after exposure to light but prior to the physical development, has to be increased after which said layer after said operation has nearly always to be subjected to a second treatment to check for formation.

Another known photosensitive material in which upon application is not necessary to carry out the objectionable treatment to increase the pH, contains a semiconductive metal oxide, for example $TiO_2$ or ZnO, which after exposure to light, is capable of forming a latent image consisting of silver nuclei upon treatment with a silver salt. In contrast with the above-mentioned material, the photosensitive compound is not present in this material in a molecular dispersed distribution. Like the layers which consist of silver halide emulsion, the photosensitive layer thereof has a granular structure which promotes the dispersion of light and adversely influences the resolving power.

Another known material contains a photosensitive compound from which, by exposure to light, a light reaction product is formed, which contains one of the following ions or molecules: $CN^-$, $SCN^-$, $NO_2^-$ $SO_3^{--}$, $S_2O_3^{--}$, $NH_3$, pyridine and thiourea. These ions or molecules are capable of withdrawing mercuric ions from the equilibrium, $$Hg_2^{++} \rightleftarrows Hg + Hg^{++}$$

which exists in a solution of a mercurous salt. As a result of this mercury atoms are formed in a quantity which is equivalent to the ions or molecules formed. The mercury atoms are combined to form mercury droplets which form the physically developable latent image. As photosensitive compounds, from which one or more of the said disproportioning ions or molecules can be liberated by exposure to light, are to be considered in particular inorganic complex compounds, for example, $K_4W(CN)_8$ in which the said ions or molecules are bound to at least one central metal ion. The photosensitive materials equipped herewith, however, are less attractive due to too low a photographic sensitivity and/or too low a dark stability.

This group of photosensitive compounds also includes the aromatic diazosulphonates which under the influence of light, dissociate at least partly into diazonium ions and sulphite ions, via an unstable intermediate product.

When the exposed layer is contacted with an aqueous solution of a mercurous salt to which preferably also a silver salt has been added, the sulphite ions react in which according to the image pattern physically developable metal nuclei are deposited in the layer. The photosensitive material equipped herewith shows the drawback that the reaction during which sulphite ions are formed, tends to occur in a reverse direction after exposure to light. This phenomenon is known as regression of the exposure result. The regression may be checked partly by the addition to the layer of certain metal ions, for example, $Cd^{++}$, for example, in the form of Cd lactate. With the sulphite ions formed, these metal ions give fully soluble or slightly dissociated sulphites. However, the regression remains noticeable which, particularly in those cases in which several exposures have to be carried out in succession on the same material is expressed in a non-acceptable difference in density between the first and last image obtained.

The invention provides a photosensitive material in which the active compound is present in a molecular-disperse state and which upon application needs no additional treatment for preventing fog as is necessary in the first-mentioned material, which has an amply sufficient sensitivity for being used for reproduction purposes and which shows a regression of the exposure result which is 10 to $10^5$ times as small as when using diazo-sulphonates. The photosensitive material according to the invention is characterized in that it contains a photosensitive compound which belongs to the class of aromatic diazothioethers of

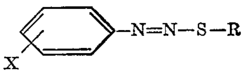

the type in which the benzene ring may contain one or more constituents X and in which R is a branched or non-branched alkyl group or aralkyl group. The moisty X may be selected from halogen, alkyl, amino, alkylated amino, phenylated amino, alkoylamino, aralkyl, nitro, hydroxy, hydroxy alkyl, carboxil, estificated carboyl, halogenated alkyl and sulfonic acid.

Aromatic diazothioethers, sometimes termed diazothiolates, have been known per se for a long time. In articles by Stadler, in Ber. 17, 2075 (1884) and by Vorländer and Mittag in Ber. 46, 3450 (1913) and Ber. 52, 413 (1919) the synthesis is described which starts from an aromatic amine which is diazotized, after which the diazonium salt is coupled with an alkylthiol:

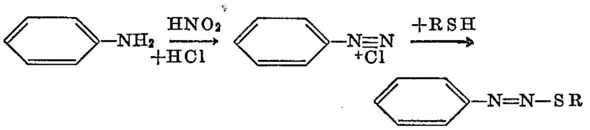

Hantzsch and Freese in Ber. 28, 3237 (1895) could not prove the transcis-isomerisation of this type of compound. In a recent article by Van Zwet and Kooyman in Rec. Trav. Chim. 86, 993 (1967) the transcis-isomerisation for this type of compounds is shown.

Although these investigators also stated that the trans-cis-isomerisation of these compounds can be effected by means of light, it certainly is not obvious after having read this article, that said compounds would be useful for application as active compounds in photosensitive material similar to that in which diazosulphonate is used as the active compound. In fact it is not known whether the trans compound behaves differently with respect to solutions of mercurous nitrate as compared with the cis compound and/or the thiol. The fact that many organic compounds with bivalent sulphur react with ions of heavy metals and that mercury compounds can in many cases form mercury-organic compounds therewith, makes one fear the worst as regards said usefulness. Moreover, nothing is known about the fact whether the trans compound is stable in the dark to such an extent that a fog-free operating photographic material of the aforementioned type can be realized with it.

A factor which is of importance in choosing a photosensitive compound is, as already noted above, the regression of the exposure result. No data are known on the basis of which one might expect that said regression in the class of the diazothioethers according to the invention will be considerably smaller than in the class of the diazosulphonates.

However, it has surprisingly been found that by using the above-mentioned diazothioethers in photosensitive material according to the invention for the above-mentioned method, beautiful fog-free images can be obtained and that the rate of the regression of the exposure result, as already stated, is 10 to $10^5$ times as small.

Further advantages of the photosensitive material according to the invention are a high extinction value at the wavelength of 366 nm. which is of importance for practical purposes and a resolving power which is at least as large as that of diazosulphonate material.

In microphotography by means of step-and-repeat cameras, optical systems are used having a large aperture which involves a low depth of definition. Due to this, focusing has to carried out very accurately. In principle this may be done effectively by means of a current of air which ensures a constant distance between the optical system and the photosensitive layer. With diazosulphonate material, this method presents difficulties, because disturbances may occur in the image formation. With the material according to the invention this is not the case, and therefore this material is excellently suitable for use with air focusing.

The sensitivity of the material according to the invention corresponds approximately to that of the above-mentioned diazosulphonate material.

A preferred embodiment of photosensitive material according to the invention is that in which in the above formula R is branched or non-branched alkyl group, for example, a secondary or tertiary butyl group, with which a very low regression of the exposure result is obtained.

Furthermore, in this group of diazothioethers are to be preferred those compounds of which X in the above formula is 4-$NO_2$ or 3,5-dichloro-4-dimethylamino. In practice, these substances have been found to give the most favourable results. It is of further advantage when in the above-mentioned formula the substituent R consists of an alkyl group having more than 8 carbon atoms. This promotes not only the diffusion stability of the photosensitive compound, but also that of the exposure results.

A few compounds which may be used within the scope of the invention have a somewhat less favourable location of the dark equilibrium. The occurrence of fog blackening by it, however, may be prevented as such by the addition of a small quantity of a soluble mercury salt to the solution with which the base layer is made photosensitive so that the action of the component causing the disproportioning is neutralized.

The introduction of the photosensitive compound in manufacturing the photosensitive material according to the invention may be effected by means of an aqueous solution of the diazo-thioether in the case of base layers which are entirely or superficially hydrophilic. When these compounds, or any other compounds which accompany the photosensitive compounds, are not sufficiently water-soluble, they may nevertheless be introduced into the layer indirectly by impregnating it with water and first displacing the water by a solvent which is water-miscible and then treating it with a solution of diazothioether and the other compounds, if any, in this solvent.

In order that the invention may be readily carried into effect, certain examples thereof will now be described in greater detail.

EXAMPLE 1

A cellulose triacetate foil saponified to a depth of 2 $\mu$m. is made photosensitive by soaking it for 1 min. in a solution of 0.1 mol 4-nitrophenyl diazothio-tert. butyl ether per litre of ethanol, after having bathed it for 5 min. in water succeeded by 30 seconds in ethanol. After removing the adhering liquid by wiping off between two rubber strips, this foil A is dried for 5 min. with a filtered current of air of room temperature (approximately 100 1/min.) and then stored in a dry condition in a closed plastic bag until the next day.

After exposure by means of a sensitometer the foil is cut into three strips in the longitudinal direction. One strip is treated immediately for 4 seconds with a bath which contains per litre of water 0.005 mol of mercurous nitrate and 0.01 mol of silver nitrate to introduce an image consisting of nuclei. A second strip is treated after 1 hour and a third strip is treated after 6 hours' storing in a conditioned space (temperature 20° C. and 50% relative humidity). The strips are then rinsed in deionized water for a short period of time and then developed for 4 minutes in a developer which contains per litre of water:

| | | |
|---|---|---|
| Ferrousammonium sulphate | mol | 0.05 |
| Ferricnitrate | mol | 0.01 |
| Citric acid | mol | 0.1 |
| Armac 12 D | gm | 0.2 |
| Lissapol N | gm | 0.2 |

(Armac 12 D is a cationic surface-active compound consisting for approximately 90% of dodecyl amine acetate, approximately 9% of tetradecyl amine acetate, and the remainder of higher alkyl amine acetate. Lissapol N is a non-ionic surface-active compound consisting of a condensation product of ethylene oxide with alkyl phenols.)

After rinsing in deionized water and drying, the resulting fog-free sensitomer strips are measured by means of a densitometer. This measurement proves that there is no difference in density between the three strips.

For comparison foils of the same cellulose triacetate, saponified to a depth of 2 $\mu$m., are photosensitized by soaking them for 1 min., in a solution of (a) 0.4 mol 4-methoxy benzene diazosulphonic acid sodium (foil 3), and a strip in a solution of (b) 0.4 mol 4-methoxy benzene diazosulphonic acid sodium and 0.1 mol cadmium lactate (foil C) per litre of water.

After drying storage, exposure and so on as described for foil A, the threshold value sensitivity (D=0.1) of foil B is found to be smaller by a factor 1.4, that of C a factor of 1.6 larger than that of the above mentioned foil A.

If, in the same manner as described for foil A, foil B is cut into 3 strips and one strip is treated in the nuclei formation bath immediately after exposure, the other after storing for ½ hour and the third after storing for 1 hour in a conditioned space and the strips are then developed, it is found that the density as a result of the storage has reduced from D=2.5 to D=0.9 and D=0.5 respectively.

In a similar manner a reduction of coil C is observed from D=2.5 to D=2.0 after storage for 30 min. and to D=1.7 after storing for 60 min., respectively.

According to an optical determination method the resolving power in favourable circumstances of exposure energy and application of a nuclei introducing bath which contains per litre 0.005 mol mercurous nitrate and 0.03 mol $AgNO_3$ and a development time of 90 seconds, is as follows:

Foil C: 1000 line pairs per mm.
Foil A: 1400 line pairs per mm.

EXAMPLE 2

Foils of saponified support material of Example 1 are sensitized in the manner described in said example with (a) a solution of 0.05 mol 3,5-dichloro-4-dimethylamino-phenyl-diazo-thiotert. butylether per litre of ethanol, or
(b) a solution of 0.05 mol 3-chloro-4-morpholino phenyl diazo-thiotert.-butyl ether per litre of ethanol.

After exposure and treatment as described in Example 1, the same result with respect to threshold value sensitivity and regression of the exposure result is obtained as is described in said example.

If a foil is sensitized with a solution of 0.1 mol 4-chlorophenyl diazothiotert.-butyl ether per litre of ethanol, the threshold value sensitivity is as factor 4 smaller, it is true, than of the just-mentioned compound, but the same favourable results as regards the regression are obtained.

EXAMPLE 3

Similar results with regard to sensitivity and regression as started in Examples 1 and 2 are obtained if foils of the saponified triacetate mentioned in Example 1 are photosensitized with solutions of 0.1 mol per litre of ethanol of compounds of the general formula

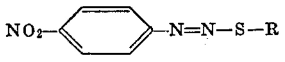

and in which R is one of the following groups: Sec.butyl, isobutyl, isopropyl, n.butyl, cyclohexyl or lauryl. The method used is quite analogous to that of Example 1.

EXAMPLE 4

The foil mentioned in Example 1 is photosensitized by soaking it for 30 seconds in a solution of 0.02 mol 3,5-dichloro - 4 - dimethylamino phenyl diazothiotriphenyl methylether per litre of methyl glycol after having bathed it for 5 min. in water succeeded by 15 seconds in methyl glycol.

If, in the same manner as described in Example 1, the foil is dried, stored, exposed and so on, it is found that the threshold value sensitivity is substantially equal to that of the compound mentioned in said example. Comparison of an exposed sensitometer strip stored in a conditioned space for ½ and 1 hour, respectively, after exposure, with a strip developed and treated immediately after the exposure shows that as a result of the regressing reaction upon storage the density has reduced from 2.5 to 2.3 and 1.7, respectively. Although this result is more unfavourable than in the compounds of the preceding examples, it is at least equally good as in a foil which is photosensitized with a solution of a diazosulphonate to which also an antiregression agent has been added, as foil C from Example 1.

EXAMPLE 5

Foils of saponified carrier material of Example 1 are photosensitized in the manner described in Example 4 with a solution of 0.02 mol. 3-chloro-4-dimethylamino phenyldiazothiodiphenylmethylether per litre of methylglycol, and with a solution which contains in addition 0.0025 mol of mercuric chloride, respectively.

After drying and storing the foils are tested sensitometrically as described in Example 1, the nuclei introducing bath containing in addition $2.5\times10^{-4}$ mole of mercuric nitrate.

It is found that the first-mentioned strip shows an inacceptable fog blackening, whereas the mercuric-containing foil is fog-free.

Equivalent results were obtained when using one of the following light-sensitive compounds instead of the ones mentioned in the preceding examples phenyldiazothiotriphenylmethylether.

2-chlorodiazothio-tert. butylether
4-dimethylaminodiazothio-tert. butylether
2-methoxydiazolthio-t-butylether
4-dimethylamino-3-chloro-6-methyldiazothio-t-butylether
4-dimethylamino-2,5-dichlorodiazothio-n-laurylether
4-methyldiazothio-t-octylether
4-acetylaminodiazothio-triphenylmethylether
4-chlorodiazothiotriphenylmethylether
4-methoxydiazothiotriphenylmethylether
3,5-dichlorodiazothiotriphenylmethylether
3,5-dichlorodiazothio-t-butylether
4-nitro-2-chlorodiazothio-t-butylether
4-nitrodiazothio-t-octylether
2,6-dichlorodiazothiotriphenylmethylether
4-nitrodiazothiobenzylether
4-nitrodiazothiotritolylmethylether
4-nitrodiazothiomethyldiphenylmethylether
4-nitrodiazothio(3-phenylpropyl)ether
4-nitrodiazothiodiphenylmethylether

What is claimed is:

1. A photosensitive material consisting of a base layer which is electrically non-conductive at least at its surface and in which or on which a photosensitive compound is present in photosensitive amounts which is of the type which, after imagewise exposure to actinic light, produces a reaction product in the exposed areas of the said material which is capable of reacting with mercurous ions in the presence of moisture and preferably in the presence of silver ions, while forming mercury and/or silver amalgam which is deposited in the form of a latent physically developable image consisting of metal nuclei, characterized in that the photosensitive compound is an aromatic diazothioether of the type

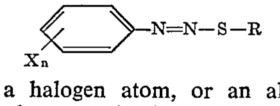

wherein X is a halogen atom, or an alkylamino, an alkoxy, an alkyl, an acylamino, or a nitro group; *n* is a whole number integer from 0 to 3; and R is an alkyl group or an aralkyl group.

2. A photosensitive material as claimed in claim 1, wherein in the formula R is an alkyl group.

3. A photosensitive material as claimed in claim 2, characterized in that in the above formula X is a 4-nitro group.

4. A photosensitive material as claimed in claim 2, characterized in that in the above formula X is a 3,5-dichloro-4-dimethylamino.

(References on following page)

References Cited

UNITED STATES PATENTS

| | | | |
|---|---|---|---|
| 2,251,156 | 7/1941 | Nygaard | 260—141 |
| 2,465,760 | 3/1949 | Sprung et al. | 96—91 |
| 2,501,693 | 3/1950 | Reynolds et al. | 260—141X |
| 2,540,011 | 1/1951 | Reynolds et al. | 260—141 |
| 2,618,555 | 11/1952 | Reichel | 96—91X |
| 2,658,876 | 11/1953 | Reynolds | 260—141X |
| 3,113,865 | 12/1963 | Sagura et al. | 96—91X |
| 3,192,194 | 6/1965 | Burg | 260—141 |

FOREIGN PATENTS

| | | | |
|---|---|---|---|
| 1,088,856 | 10/1967 | Great Britain | 96—91 |

OTHER REFERENCES

Saunders, K. H., "The Aromatic Diazo Cpds," 2nd ed., 1949, pp. 192–193.

J. TRAVIS BROWN, Primary Examiner

C. L. BOWERS, JR., Assistant Examiner

U.S. Cl. X.R.

96—49.75; 260—141

PO-1050
(5/69)

UNITED STATES PATENT OFFICE
CERTIFICATE OF CORRECTION

Patent No. 3,578,457 (PHN 3023) Dated May 11, 1971

Inventor(s) HARKE JAN HOUTMAN ET AL

It is certified that error appears in the above-identified patent and that said Letters Patent are hereby corrected as shown below:

Column 1, line 61, "for" should read -- fog --.

Column 2, line 59, after "of" (second occurrence) insert -- the type --.

line 64, cancel "the type".

Signed and sealed this 16th day of May 1972.

(SEAL)
Attest:

EDWARD M.FLETCHER,JR.
Attesting Officer

ROBERT GOTTSCHALK
Commissioner of Patents